Patented Nov. 25, 1924.

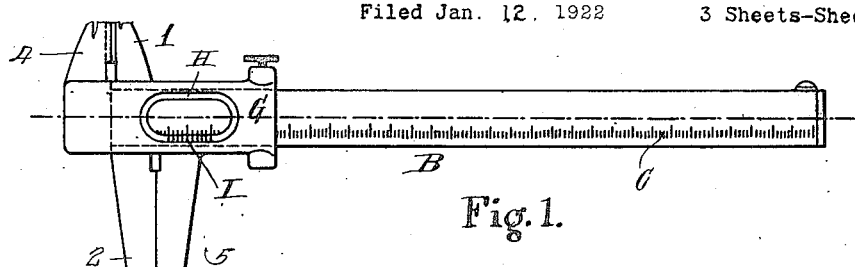
Fig. 1.
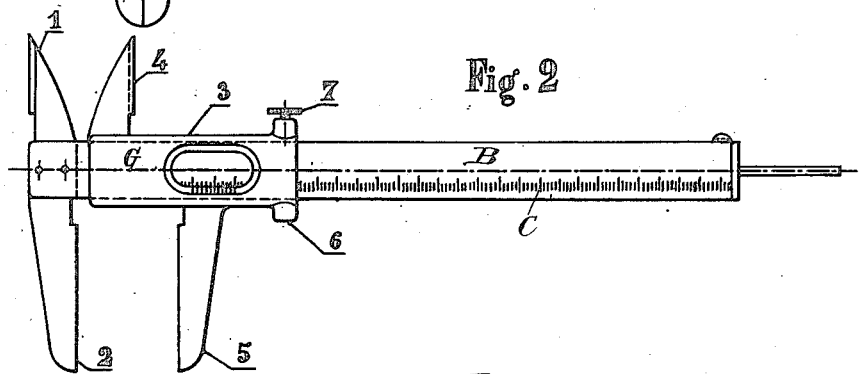
Fig. 2.
Fig. 3.
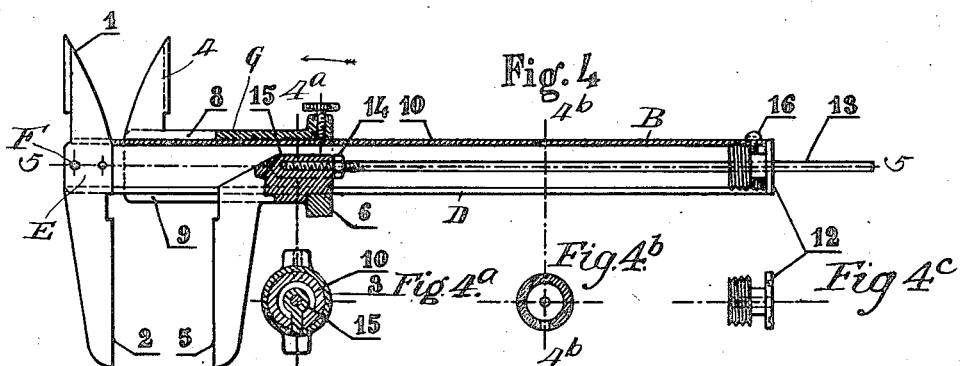
Fig. 4.   Fig. 4ᵃ.   Fig. 4ᵇ.   Fig. 4ᶜ.
Fig. 5.
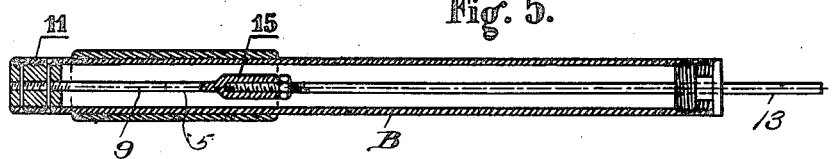

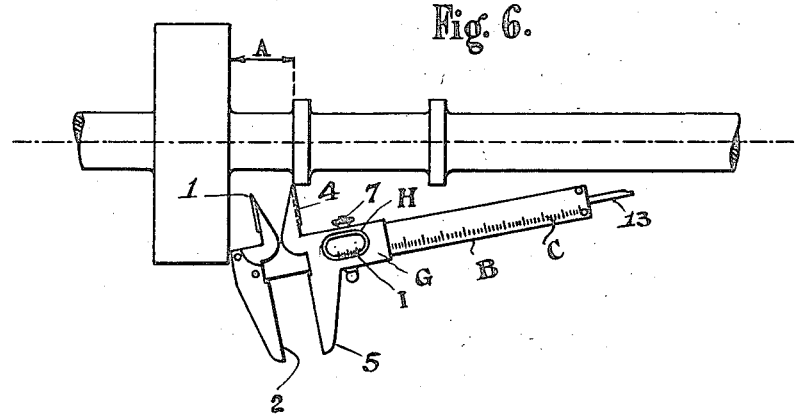
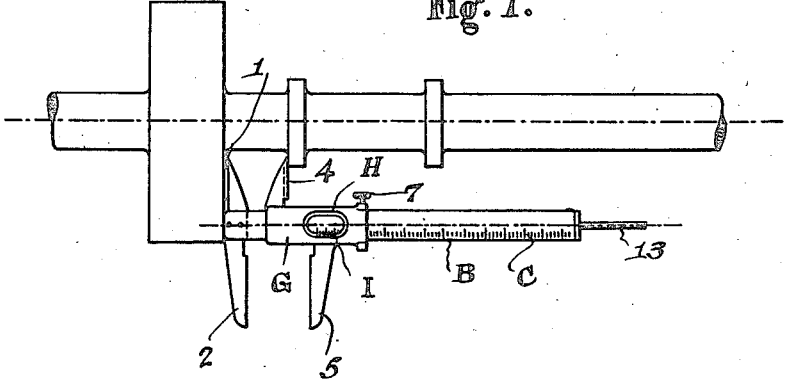

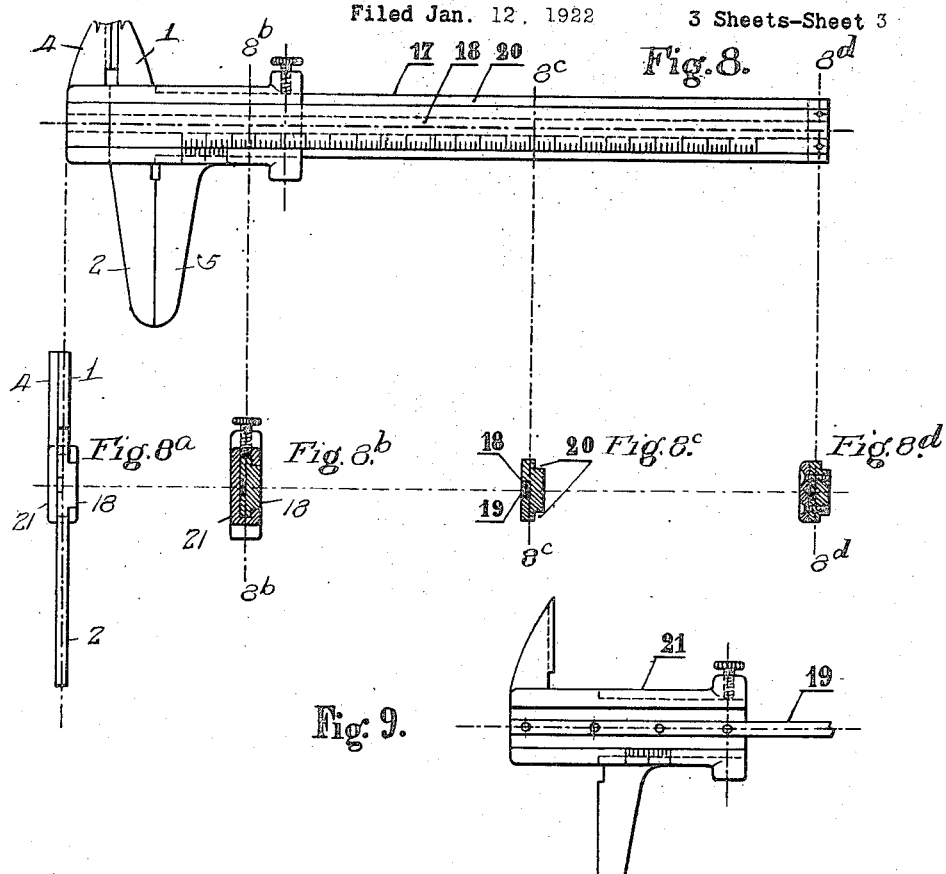

1,516,631

UNITED STATES PATENT OFFICE.

JOSEPH D'AUTEMARRE D'ERVILLÉ, OF CHARENTON, FRANCE.

SLIDING CALIPERS.

Application filed January 12, 1922. Serial No. 528,877.

*To all whom it may concern:*

Be it known that I, JOSEPH D'AUTEMARRE D'ERVILLÉ, a citizen of the Republic of France, and a resident of Charenton, Seine, in the Republic of France, have invented certain new and useful Improvements in Sliding Calipers, of which the following is a specification.

This invention relates to improvements in sliding calipers, the object of the invention being to provide an improved instrument of this kind which is adapted for use in measuring inside and outside diameters and also for measuring the depth of work and which, is simple in construction and may be very readily adjusted as may be required.

With the above and other objects in view the invention consists in the construction, combination and arrangement of devices hereinafter described and claimed.

In the accompanying drawings,

Figure 1 is an elevation of my improved calliper showing the same closed.

Figure 2 is a similar view showing the same open.

Figure 3 is a plan of the same.

Figure 4 is a longitudinal, central, sectional view of the same.

Figure 4ª is a transverse sectional view of the same on the plane indicated by the line 4ª—4ª of Figure 4.

Figure 4ᵇ is a similar view on the plane indicated by the line 4ᵇ—4ᵇ of Figure 4.

Figure 4ᶜ is a detail elevation of the plug, showing the same detached from the tubular bar.

Figure 5 is a longitudinal section on the plane indicated by the line 5—5 of Figure 4.

Figure 6 is a diagram of a pair of ordinary calipers, showing that the same cannot be employed for measuring a distance A.

Figure 7 is a similar view of my improved calliper showing the same employed for successfully measuring such distance.

Figure 8 is an elevation showing a modified construction of my improved caliper showing the same closed.

Figure 8ª is an end elevation of the same.

Figure 8ᵇ is a sectional view of the same on the plane indicated by the line 8ᵇ—8ᵇ of Figure 8.

Figure 8ᶜ is a similar view, on the plane indicated by the line 8ᶜ—8ᶜ of Figure 8.

Figure 8ᵈ is a similar view on the plane indicated by the line 8ᵈ—8ᵈ of Figure 8.

Figure 9 is a detail elevation of the slide.

Figure 10 is an elevation of said modified construction, showing the caliper in open position.

Figure 11 is a plan of the same.

Referring first to the form of my invention shown in Figures 1 to 5 inclusive, the bar B is a tube and is provided with a suitable scale C and also with a slot D which extends therethrough from end to end.

Extending through and secured in one end of the bar B as by means of rivets F is a member E which is formed with integral oppositely extending jaws 1, 2 arranged respectively for measuring inside and outside diameters.

A tubular slide G is slidable on the bar B and is provided in one side with a sight opening H having a scale I for operation in connection with the scale C. The slide has a set screw 7 to secure it at any desired adjustment on the bar and is also provided with a lug 6 which may be conveniently pressed by the thumb or a finger in order to move or adjust the slide. The slide is also provided with a jaw 4 for use in connection with the jaw 1 for measuring inside diameters.

The jaws 1—4 are slightly out of line with each other and the slide is provided with a longitudinal slot 8 to clear the jaw 1 and also with a slot 9 to clear the jaw 2 and thus enable the slide to be moved to a closed position as shown in Figure 1 or to open position for measuring either inside or outside diameters as shown in Figure 2. Said slot 9 extends from the outer end of the slide nearly to the inner end thereof, as shown in Fig. 4, so that said slide is open on one side.

A jaw 5 for measuring outside diameters in connection with jaw 2 passes through the slot 9 of the slide G and the slot D of the tubular bar B and is provided at its inner end with a head 15 which is arranged in the center of the bore of the tubular bar and is slidable in said bar either with or independently of the slide G, the said head having a threaded opening in which is screwed one end of a gage rod 13. Said rod has a nut 14 which bears against the head 15 and said rod is slidable through a central opening in a plug 12, said plug being screwed in the outer end of the tubular bar and being provided with an annular circumferential groove which receives a set screw 16. When the slide G is moved in the direction indicated by the arrow in Figure 4 the jaw 5 as well as the jaw 4 moves therewith, as will be understood. Said slide can be moved in the opposite direction with the jaw 4 and independently of the jaw 5, by means of the rod 13 since the head 15 and the jaw 5 are longitudinally movable in the slide as heretofore described.

To measure an inside diameter the slide G must be moved in the reverse direction to the arrow shown in Figure 4 to cause the jaws 1—4 to pass each other and to assume a position with their straight edges presented in opposite direction and at the required distance apart, according to the diameter to be measured as shown in Figures 2 and 4. To measure an outside diameter the slide G must be moved the required distance in the direction of the arrow of Figure 4 to cause the straight edges of the jaws 2—5 which are opposed to each other, to engage opposite sides of the work or diameter to be measured as will be understood. The measurements will be read on the scales C, I. Having made an inside measurement, involving the use of the jaws 1—4 in the event that it should also be desired to make an outside measurement without altering the position of the slide G, this may be done by moving the jaw 5 toward or from the jaw 2 by means of the gage rod 13 as will be understood.

In the modified form of my invention shown in Figures 8 to 11, inclusive, the bar 17 is flat, is provided with longitudinal rebates 20 Fig. 8ᶜ on one side at its opposite edges and the slide has a channel of corresponding shape in cross section to receive the said bar. The bar is also provided in one side with a longitudinal groove 18 to receive the gage rod 19, said gage rod being also flat.

In this form of the invention the slide is indicated at 21, Figs. 9 and 10, provided with shoulders 23 which operate in the rebates 20 and one of which has a scale which operates in conjunction with the scale of the bar to indicate the measurements.

The slide, whether in the form shown in Figures 1 to 5 or in the form shown in Figures 8 to 11, enveloping or partly enveloping the bar, is elastic and tends to close on the bar and functionally grips the bar with such force as to take up play and prevent casual movement of the slide on the bar, thus greatly increasing the efficiency of the instrument and enabling measurements to be made therewith with precision.

While I have herein shown and described two forms of my invention I would have it understood that other modifications may be made without departing from the spirit of my invention and within the scope of the appended claims.

Having thus described my invention, I claim:

1. A sliding caliper comprising a bar having fixed jaws, one for inside and the other for outside diameters; and a slide movable on said bar and also having jaws for inside and outside diameters, said slide substantially enveloping said bar, being open on one side, and being elastic, so that by its own elasticity it frictionally grips said bar and prevents casual movement of the slide thereon.

2. In a sliding caliper, a bar provided at one end with a jaw for inside diameter and a jaw for outside diameter, the straight edges of said jaws facing respectively in opposite directions: a slide movable on the bar and having jaws one for measuring inside diameters and the other for measuring outside diameters, said jaws being out of line with those of the bar and the said slide having slots affording clearance for the jaws of the bar so that a jaw of the slide can be moved past the corresponding jaw of the bar.

3. In a sliding caliper, a bar provided at one end with a jaw for inside diameter and a jaw for outside diameter, the straight edges of said jaws facing respectively in opposite directions; a slide movable on the bar and having jaws one for measuring inside diameters and the other for measuring outside diameters, said jaws being out of line with those of the bar and the said slide having slots affording clearance for the jaws of the bar so that a jaw of the slide can be moved past the corresponding jaw of the bar, one of the jaws of the slide being movable longitudinally independently thereof, as well as movable therewith, and a gage rod for independently moving said last mentioned jaw.

4. In a sliding caliper, a bar provided at one end with a jaw for inside diameter and a jaw for outside diameter, the straight edges of said jaws facing respectively in opposite directions; a slide movable on the bar and having jaws one for measuring inside diameters and the other for measuring outside diameters, said jaws being out of line with those of the bar and the said slide having slots affording clearance for the jaws of the bar so that a jaw of the slide can be moved past the corresponding jaw of the bar, one of the jaws of the slide being movable longitudinally independently thereof, as well as movable therewith, and a gage rod for independently moving said last mentioned jaw, said gage rod being arranged and longitudinally movable in said bar.

In witness whereof I affix my signature.

JOSEPH d'AUTEMARRE d'ERVILLÉ.